United States Patent Office 3,130,098
Patented Apr. 21, 1964

3,130,098
METHOD FOR PROVIDING IMPROVED DIFFRACTION GRATED LINES ON GLASS BODY SURFACE
William C. Levengood, Muncie, Ind., assignor to Ball Brothers Company, Incorporated, Muncie, Ind., a corporation of Indiana
No Drawing. Filed Sept. 29, 1960, Ser. No. 81,660
15 Claims. (Cl. 156—15)

This invention relates generally to spectrograph gratings and particularly, to producing a reflection grating surface on glass in the nature of permanent lines of improved characteristics. The invention is applicable to standard gratings as well as gratings used in the ultraviolet and in the soft X-ray region of the spectrum.

An ordinary diffraction grating used in the visible spectral region may be produced by ruling very fine lines in an aluminum film deposited on glass. However, a grating ruled in such a metal film deteriorates with age and it is often necessary to remove the metal and completely rerule the grating, which is a very costly procedure. If, however, a grating is made directly on glass, then when the metal overcoating deteriorates, it is only necessary to recoat the grating, thus eliminating the reruling procedure.

Also aluminum films are transparent to wave lengths of light traversing the far ultraviolet portion of the spectrum, and therefore they do not reflect such light. Consequently, diffraction gratings formed by ruling lines on aluminum films are not useful in connection with the diffraction of light of a wave length of approximately 0.15 micron. Glass is, however, highly reflective in this spectral region.

A major problem encountered with the use of glass, however, is that of overcoming the difficulty of adequately ruling diamond lines thereon. Due to the brittle nature of glass, it is necessary to use very light loads on the diamond tool to prevent chipping and scratching of the glass and to reduce diamond wear. As a result, the ruled grating lines produced on the glass are extremely fine and very shallow in depth. However, by utilizing my new treating solution, I have not only been able to usefully develop such lightly formed grating lines by increasing their depth and improving their contrast, but also I have been able to provide a completely new method of forming grating lines on glass.

It has thus been an object of my invention to provide an increase of groove depth and contrast of individual lines in a glass grating;

Another object has been to devise a treating solution for providing grating lines on glass and for developing existing lines to make them more efficient in their optical utilization;

Another object has been to develop grating procedure that provides suitable lines for use in the ultraviolet as well as soft X-ray region of the spectrum, and that is applicable to both soft optical types of glass as well as to so-called hard glasses of the soda-lime-silica type;

A further and important object has been to develop a method of treating lines on glass that have been ruled directly thereon by an available or conventional technique, such as the usual mechanical ruling engine technique, to improve as well as emphasize such lines, particularly from the standpoint of their optical properties;

An additional object of my invention has been to provide a new method of forming grating lines on a glass surface by transferring lines formed in an aluminum coating on the glass, to the glass, itself, by means of chemical treatment;

A still further object of my invention has been to devise an improved grating on glass and method of accomplishing it without damage to the glass or to the grating lines;

These and other objects of my invention will appear to those skilled in the art from the specification and the claims.

In carrying out my invention, it is now known to rule very light or extremely fine trace lines of shallow depth on a glass surface, as by a diamond-pointed tool, without chipping and scratching the glass. I then chemically treat the mechanically ruled trace lines by subjecting them to a special solution to increase the groove depth and contrast of the individual lines on the ruled surface. This is accomplished without appreciably increasing their width or destroying their continuity.

In furtherance of my invention, I have found that an ordinary diffraction grating, such as is ruled in an aluminum film deposited on glass, may be transferred directly to the glass by chemical treatment. The aluminum surface containing the ruled diffraction grating is first cleaned with calcium carbonate, rinsed with distilled water and dried. The aluminized grating is then placed in a special etching solution for a period of approximately seven hours. At the end of the etching period, the grating section is withdrawn from the solution and placed in concentrated potassium hydroxide to remove the aluminum film, leaving the ruled grating etched in the glass surface. The thus formed grating is then chemically treated in a like manner as the mechanically ruled trace lines, to increase the groove depth and contrast of the lines.

The spacing of regular diffraction gratings ordinarily varies between 10,000 and 50,000 lines per inch and, in this sense, governs the resolution or quality of the grating, and makes it applicable in the ultraviolet through the visible range. Of course, it will be recognized that the more ruled lines, the more expensive the grating. An ordinary grating generally has a width of about 6 to 8 inches. However, I have found that any size of grating may be conditioned in accordance with my invention with improved results. My chemical treatment not only materially increases the depth of grating lines previously formed on glass surfaces, but also it may be utilized to initially form or transfer grating lines onto such surfaces. When treating established grating lines, the width increase is restricted, due to the morphology of the lines, whereas the desired depth increase is the predominant effect produced.

After extensive study and work in this field, which has been complicated by the need for a chemical treatment which would be applicable to various types of glasses and keeping in mind an important factor, namely that it should be effective, and preferential or selective, I have been able to develop what may be termed a balanced aqueous chemical etching solution which essentially contains an alkali metal fluoride, hydrochloric acid, an alkali metal dichromate, and chemically pure or distilled water. The alkali metal dichromate may be deleted from the composition, if desired; however, sharper grating lines with improved contrast are definitely produced when the dichromate ion is present in the solution. The ratio of composition of the solution should be maintained within defined limits from the standpoint of producing a synergistic effect which effectively and preferentially increases the depth of the groove lines while restricting their increase in width and which produces smoother and more sharply defined uniform lines. I have found that operable results are obtainable by utilizing a ratio of about 1½ to 2½ parts by weight of an alkali metal fluoride to each part by weight of concentrated hydrochloric acid when diluted with about 100 to 400 parts by weight of water per part by weight of the hydrochloric acid. Further, a ratio of about 10 to 50 parts, and particularly about 20 to 40 parts, by weight of concentrated hydrochloric acid for each part by weight of alkali metal dichromate produces the sharper grating lines.

For enhancing grating lines on a regular lead-containing optical glass, the following chemical composition of the solution, when diluted to about 10% by volume, gives optimum results, although slight variations in the content may be employed without departing from the improved results of my invention (such as an equivalent amount of KF may be substituted for $KF \cdot 2H_2O$):

(A)

| | |
|---|---|
| Hydrated potassium fluoride ($KF \cdot 2H_2O$) | About 20 gms. |
| Concentrated (48% HCl) hydrochloric acid | About 7 cc. |
| Potassium dichromate ($K_2Cr_2O_7$) | About 0.2 gm. |
| Distilled water ($H_2O$) | About 600 cc. |

Although chemical solution or etchant A is preferably diluted to about 10% by volume of the stock solution when used on the usual lead-containing types of optical grating glass, the concentration may be varied between about 5% and 15% by volume depending upon the type of lead-containing optical glass on which the ruling lines are formed.

An optimum chemical composition of solution for transferring grating lines from an aluminum film to the surface of the glass upon which the film is deposited, and for developing existing grating lines on soda-lime-silica glasses contains the following mixture:

(B)

| | |
|---|---|
| Sodium fluoride (NaF) | About 6.6 gms. |
| Concentrated hydrochloric acid (HCl) | About 3.3 cc. |
| Sodium dichromate ($Na_2Cr_2O_7 \cdot 2H_2O$) | About 0.2 gm. |
| Distilled water ($H_2O$) | About 90 cc. |

The optimum dilution of solution B for both uses is about 10% by volume of the solution. However, this may be varied from about 5% to 15% by volume for etching existing lines, depending on the specific type of glass on which the grating lines are produced.

The treatment time for enhancing existing lines extends over broad limits depending on the type of glass. For example, the times used have been varied between 30 seconds to two hours. Where a new type of glass is to be treated, I first examine small scrap sections to determine the optimum time and dilution of the chemical solution or etchant.

After lines are ruled on the surface of the glass, it is preferably cleaned by using precipitated calcium carbonate, followed by a distilled water rinse, and is then dried, as by absorbent tissue, all as preliminary to the application of my chemical solution. The time element employed for the application of the chemical solution will control the desired depth of the lines forming a part of the spectrograph.

Although it is well known that hydrofluoric acid readily attacks and etches glass, I have found through experimentation that when grating lines were merely treated with hydrofluoric acid, very uneven etched lines were produced which would be deleterious in spectrograph analysis. My solution, however, produces a synergistic action providing special etching characteristics, above described, which are necessary to achieve the desired end result.

In forming or providing initial or starting tracing lines on the surface of a glass body by utilizing an aluminized grating, I have found that a solution of sodium fluoride and concentrated hydrochloric acid may be used with or without sodium dichromate. In other words, I employ a solution of the same type as employed in producing the final lines on lime glass in this connection. If the glass body is of lead glass, I then employ the potassium solution of my invention. As to the specific potassium solution of Example A, it will be noted that it contains about 62 parts by weight of potassium fluoride, about 42 parts by weight of concentrated hydrochloric acid to each part by weight of potassium dichromate, and about 5500 to 6500 parts by weight of water. In the sodium solution, Example B, there are about 33 parts by weight of sodium fluoride, about 20 parts by weight of concentrated hydrochloric acid to each part by weight of sodium dichromate, and about 900 to 1000 parts by weight of water.

As will be apparent to those skilled in the art, various additions, omissions and substitutions may be made in my etching or chemical treating solution and in the procedural steps outlined without departing from the spirit and scope of the invention.

What I claim is:

1. A method for providing improved diffraction grated lines on the surface of a glass body member which comprises, forming preliminary grating lines on the surface of the member, cleaning the surface, and applying an aqueous treating solution to the lines to increase the depth and improve the contrast and smoothness thereof without significantly increasing the width of the lines; said treating solution comprising an alkali metal fluoride and concentrated hydrochloric acid.

2. A method for providing improved diffraction grated lines on the surface of a glass body member which comprises, forming preliminary grating lines on the surface of the member, cleaning the surface, and applying an aqueous treating solution to the lines to increase the depth and improve the contrast and smoothness thereof without significantly increasing the width of the lines; said treating solution comprising an alkali metal fluoride, concentrated hydrochloric acid and an alkali metal dichromate.

3. A method as defined in claim 1 in which the treating solution contains one part by weight of concentrated hydrochloric acid and about 1½ to 2½ parts by weight of the alkali metal fluoride.

4. A method as defined in claim 2 in which the treating solution comprises about 20 to 40 parts by weight of concentrated hydrochloric acid for each part by weight of the alkali metal dichromate, about 1½ to 2½ parts by weight of the alkali metal fluoride for each part by weight of the hydrochloric acid, and about 100 to 400 parts by weight of water for each part by weight of hydrochloric acid.

5. A method as defined in claim 2 in which the treating solution consists essentially of proportioned amounts of sodium fluoride, concentrated hydrochloric acid, and sodium dichromate.

6. A method as defined in claim 5 wherein the proportions of the treating solution are as follows: the sodium fluoride is in the amount of 33 parts by weight, the concentrated hydrochloric acid is in the amount of 20 parts by weight to each part by weight of the sodium dichromate, and water is in the amount of about 900 to 1000 parts by weight.

7. A method as defined in claim 2 in which the treating solution consists essentially of proportioned amounts of potassium fluoride, concentrated hydrochloric acid, and a dichromate from the class consisting of sodium and postassium chromates.

8. A method as defined in claim 7 in which the proportions in the treating solution are as follows: the potassium fluoride is in the amount of about 62 parts by weight, the concentrated hydrochloric acid is in the amount of about 42 parts by weight to each part by weight of potassium dichromate, and water is in an amount of about 5500 to 6500 parts by weight.

9. A method as defined in claim 1 wherein the cleaning is effected by applying precipitated calcium carbonate to the surface, rinsing and drying it.

10. A method as defined in claim 1 wherein the preliminary grating lines are formed by subjecting lines of a diffraction grating ruled on an aluminum film coating that is applied to the surface of the glass body member to an aqueous chemical treating solution containing proportioned amounts of an alkali metal fluoride and concentrated hydrochloric acid.

11. A method as defined in claim 10 wherein the aqueous chemical treating solution to which the lines of the aluminum grating are subjected contains proportioned amounts of sodium fluoride, concentrated hydrochloric acid and sodium dichromate.

12. A procedure as defined in claim 10 wherein the aluminum film coating is removed from the surface of the glass body member after the forming of preliminary grating lines by applying potassium hydroxide thereto.

13. A method of providing an improved glass diffraction grated member which comprises, forming preliminary grating line grooves on a surface of a glass body member, applying an aqueous chemical treating solution to the line grooves, and synergistically and predominantly increasing their depth and resolution while restricting an increase of their width and improving their smoothness, sharpness and resolution, and wherein the solution consists essentially of proportioned amounts of an alkali metal fluoride, concentrated hydrochloric acid, and on alkali metal dichromate.

14. A method as defined in claim 13 wherein the aqueous chemical treating solution consists essentially of proportioned amounts of sodium fluoride, concentrated hydrochloric acid, and an alkali metal dichromate.

15. A method as defined in claim 13 wherein the aqueous chemical treating solution consists essentially of proportioned amounts of potassium fluoride, concentrated hydrochloric acid, and an alkali metal dichromate.

References Cited in the file of this patent

UNITED STATES PATENTS

| | | |
|---|---|---|
| 2,463,280 | Koehni et al. | Mar. 1, 1949 |
| 2,622,016 | Gilstrap | Dec. 16, 1952 |

FOREIGN PATENTS

| | | |
|---|---|---|
| 273,046 | Great Britain | June 30, 1927 |
| 471,703 | Great Britain | Sept. 9, 1937 |

OTHER REFERENCES

Nicott: "A New Chemcial Method of Reducing the Reflectance of Glass," reprinted from R.C.A. Review, vol. VI. No. 3, January 1942, pp. 291–295 relied on.